US 7,934,834 B2

(12) United States Patent
Slobodin et al.

(10) Patent No.: US 7,934,834 B2
(45) Date of Patent: May 3, 2011

(54) METHOD AND APPARATUS FOR WIRELESS IMAGE TRANSMISSION TO A PROJECTOR

(75) Inventors: David Elliott Slobodin, Lake Oswego, OR (US); Rob Hoeye, Tigard, OR (US); Jorell A. Olson, Portland, OR (US); Paul Long, Newberg, OR (US); Marques Ronald Girardelli, Portland, OR (US); Joshua Duffy, Vancouver, WA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/818,868

(22) Filed: Jun. 18, 2010

(65) Prior Publication Data
US 2010/0253592 A1    Oct. 7, 2010

Related U.S. Application Data

(60) Division of application No. 11/708,780, filed on Feb. 20, 2007, which is a continuation of application No. 09/877,909, filed on Jun. 7, 2001, now Pat. No. 7,180,475.

(51) Int. Cl.
*G03B 21/26* (2006.01)
*G03B 21/00* (2006.01)
*G09G 5/00* (2006.01)
*G06F 15/173* (2006.01)
*G06F 3/00* (2006.01)
*H04H 20/71* (2008.01)
*H04B 1/18* (2006.01)

(52) U.S. Cl. ........... 353/30; 353/121; 345/2.3; 715/732; 715/736; 455/3.01; 455/151.2

(58) Field of Classification Search .................... 353/30, 353/25, 121; 345/2.3; 709/225; 715/730–736; 455/3.01, 151.2
See application file for complete search history.

(56) References Cited

U.S. PATENT DOCUMENTS
5,612,744 A    3/1997 Lee et al.
(Continued)

FOREIGN PATENT DOCUMENTS
EP    0 841 637 A2    5/1998
(Continued)

OTHER PUBLICATIONS

Ebrahimi, Touradj and Caspar Horne; "MPEG-4 natural video coding—An overview"; *Signal Processing: Image Communication*; 2000; pp. 365-385; vol. 15, No. 4/5.

(Continued)

*Primary Examiner* — Georgia Y Epps
*Assistant Examiner* — Magda Cruz
(74) *Attorney, Agent, or Firm* — Kilpatrick Townend & Stockton LLP

(57) ABSTRACT

A method and apparatus is provided in which a digital image is transmitted to a presentation projector resource over a wireless transmission medium using a reduced amount of transmission bandwidth by transmitting a subset of the digital image data. The subset image data may be a delta subset that represents those areas of the image that have changed since the previous transmission. Header data is provided to further describe the subset image data. A projector discovery logic selects a suitable projector resource based on the order or signal strength of the discovery replies. A wireless image transmission session is established with the selected projector resource during which the projector is unavailable to other devices. The subset image data may be compressed and transmission coordinated with the projector resource so that the data is sent only when it is ready to be received.

20 Claims, 15 Drawing Sheets

U.S. PATENT DOCUMENTS

| | | | |
|---|---|---|---|
| 5,658,063 A | 8/1997 | Nasserbakht | |
| 5,668,566 A | 9/1997 | Yen | |
| 5,689,562 A | 11/1997 | Hassan et al. | |
| 5,757,970 A | 5/1998 | Callahan et al. | |
| 5,847,748 A | 12/1998 | Laughlin | |
| 5,940,049 A | 8/1999 | Hinman et al. | |
| 6,182,075 B1 | 1/2001 | Hsu | |
| 6,343,313 B1 | 1/2002 | Salesky et al. | |
| 6,735,616 B1 | 5/2004 | Thompson et al. | |
| 6,760,045 B1 | 7/2004 | Quinn et al. | |
| 6,830,340 B2 | 12/2004 | Olson et al. | |
| 6,860,609 B2 | 3/2005 | Olson et al. | |
| 6,985,589 B2 * | 1/2006 | Morley et al. | 380/269 |
| 7,018,043 B2 | 3/2006 | Castaldi et al. | |
| 2002/0036652 A1 | 3/2002 | Masumoto et al. | |
| 2002/0056081 A1 | 5/2002 | Morley et al. | |
| 2002/0109729 A1 | 8/2002 | Dutta | |

FOREIGN PATENT DOCUMENTS

| | | | |
|---|---|---|---|
| EP | 1 069 776 A2 | 1/2001 | |
| JP | 10-145796 A | 5/1998 | |
| JP | 2000-152202 A | 5/2000 | |
| JP | 2000-222163 A | 8/2000 | |
| JP | 2001-036900 A | 2/2001 | |
| JP | 2001-103491 A | 4/2001 | |

OTHER PUBLICATIONS

DDWG Promoters, "Digital Visual Interface, (DVI) Revision of 1.0," Digital Display Working Group, Apr. 2, 1999, p. 10.

Visual Innovations—Sharp Notevision5 (SG-NV5XU), www.vis-innov.com/products/projectr/sharp/nv5.htm, pp. 1-3, printed from website on Mar. 21, 2001.

"Series T: Terminal Equipments and Protocols for Telematic Services", International Telecommunication Union, pp. 1-17, Geneva 1996.

"Digital Visual Interface, Revision 1.0", Digital Display Working Group, pp. 1-76, Apr. 2, 1999.

* cited by examiner

117 - Header Data

| Identifier | Size | Revision | Height | Width | Bits/Pixel | H-position | V-position | Data Coding Algorithm | Compressed Size |
|---|---|---|---|---|---|---|---|---|---|

FIG. 9

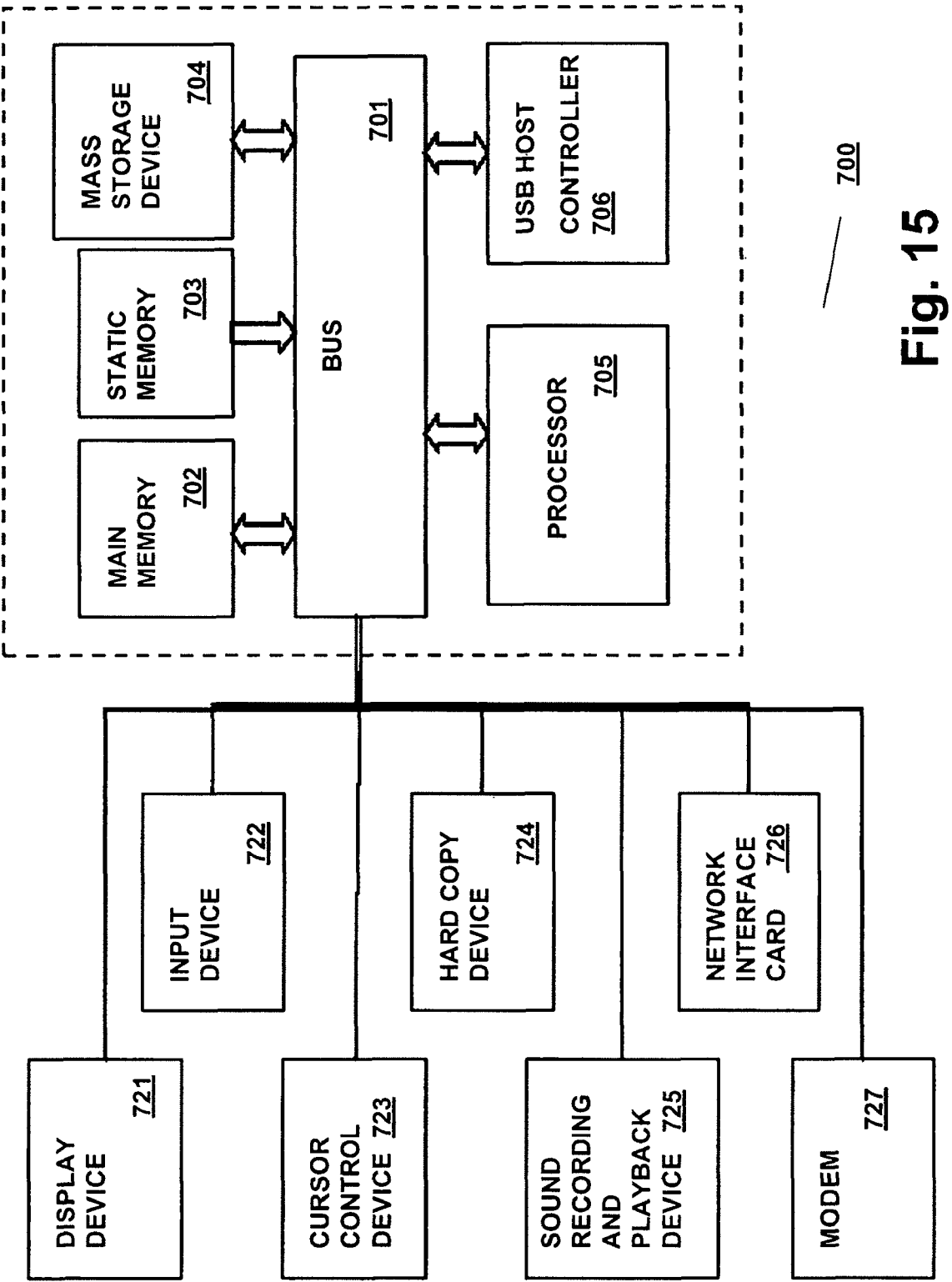

METHOD AND APPARATUS FOR WIRELESS IMAGE TRANSMISSION TO A PROJECTOR

CROSS REFERENCE TO RELATED APPLICATIONS

This application is a division of U.S. patent application Ser. No. 11/708,780, filed Feb. 20, 2007, which is a continuation of U.S. patent application Ser. No. 09/877,909, filed Jun. 7, 2001. The entireties of the above listed documents are hereby incorporated herein by reference for all purposes.

BACKGROUND

The present invention relates generally to presentation projectors for projecting computer generated presentations and other images to a viewing surface. In particular, the present invention relates to technology that enables the wireless transmission of an image to a presentation projector.

The widespread acceptance of using computers to facilitate group communications has created a large demand for devices that project computer displays. As a result, corporate enterprises have installed multimedia projection systems in many workplace conference rooms, or provide access to portable presentation equipment that can be used in conference rooms as needed. In a typical operating mode, multimedia projection systems receive analog video signals from a personal computer ("PC"). The video signals may represent still, partial, or full-motion display images of a type rendered by the PC. The analog video signals are typically converted in the projection system into digital video signals, and the signals are electronically conditioned and processed to control an image-forming device, such as a liquid crystal display ("LCD") or a digital micro-mirror device ("DMD").

A popular type of multimedia projection system employs a broad-spectrum light source and optical path components upstream and downstream of the image-forming device to project the image onto a display screen. An example of a DMD-based multimedia projector is the model LP420 manufactured by InFocus Corporation, of Wilsonville, Oreg., the assignee of the present application.

To display their presentations, users tote portable computers such as laptops into the conference room, and attach the computer to the projector using a connecting cable. The necessity of carrying heavy cabling to attach the computer to the projector is inconvenient, especially when giving mobile presentations. Issues of cable compatibility or malfunction may occur and the set-up time is increased. Moreover, if more than one presenter uses the projection equipment, each with their own laptops, then each successive presenter needs to repeat the cabling set-up procedure, which results in a delay between presentations.

One way to eliminate the cabling problem is to transmit the image over a wireless communications link instead of a cable connection. Wireless transmission of an image to a projector is known in the art. For example, U.S. Pat. No. 5,847,748, Multimedia Projection System, which issued on Dec. 8, 1998, to David P. Laughlin, (the "'748 patent") discloses a multimedia projection system that includes a notebook computer that has an integral projector. The projector described in the '748 patent is capable of receiving information from the computer's central processing unit through a cable or a wireless communication circuit, including an infrared communication circuit.

An example of a prior art wireless presentation projector is the Notevision5 Liquid Crystal Display (LCD) projector manufactured by the Sharp Electronics Corporation of Mahwah, N.J. The Notevision5 LCD projector features an infrared communication capability, which allows users to transfer digital images from a laptop or a compatible device directly to the projector. The Sharp Notevision5 LCD projector relies on an Infrared Data Association (IrDA) data communication standard to transmit the image from the computer to the projector. One of the drawbacks to using the IrDA data communication standard is the bandwidth limitation inherent in infrared communications. Transmission data rates are low, with a maximum data transmission speed of up to 4 Mb/s (megabytes per second). This results in a very slow image update, typically up to at least 15 seconds per screen. The slow image update rate is unacceptable to most presentation system users.

In an effort to overcome the low data transmission rates, the IrDA data communication standards provide for converting and storing images in a compressed format in order to reduce the amount of data that is transmitted. The Sharp Notevision5 projector uses the Joint Photographic Experts Group (JPEG) image compression format, which is documented by the International Organization for Standards (ISO) in ISO standard 10918, Information technology—Digital compression and coding of continuous-tone still images, first published in 1994. However, the conversion and storage of the image using the JPEG image compression format is a process that is computationally intensive and necessarily delays the transmission of the image from the computer to the projector. Moreover, the size of the compressed JPEG images of a typical presentation is still unacceptably large, which does not allow for satisfactory update rates for displaying a wireless projected image.

Yet another drawback inherent in the use of the IrDA data communication standard is that infrared communication is a short-range technology limited to about a 30-50 foot radius. In addition, infrared communication is highly directional because the infrared signals cannot penetrate solid objects. Thus, interference is common and the signals can even be affected by indoor lighting (e.g. the use of fluorescent lights) and air quality (e.g. the presence of dust or smoke).

What is needed, therefore, is an improved method of wireless image transmission between a computer and a projector. In particular, the wireless transmission of an image that is independent of the wireless transmission medium and that provides for faster updates of the projected image in an efficient and user-friendly way presents a unique set of challenges, requiring a new and novel solution.

SUMMARY

According to one aspect of the invention, a method is provided in which a digital image is transmitted to a presentation projector resource over a wireless transmission medium using a reduced amount of transmission bandwidth. The method transmits a subset of the digital image and header data that describes the subset of the digital image. The subset of the digital image may comprise one or more blocks of image data that represent the smallest bounding rectangle that encompasses those areas of the digital image that have changed since the previous transmission, referred to herein as delta image data. The smallest bounding rectangle encompassing the delta image data is determined using a screen scraper sender logic that obtains the screen scrape from a raster graphics image in a video memory buffer Alternatively, the subset of the digital image may comprise graphic primitives which the screen scraper sender logic encodes in a scalable vector graphics (SVG) format, referred to herein as SVG image data. The screen scraper sender logic creates the header data to identify which type of subset of the digital image is being transmitted, as well as certain details about the transmitted image, including the image size, height, width, and position.

According to one aspect of the invention, the image transmission is initiated using a projector discovery logic which is activated in response to a single user action, to automatically discover and select suitable presentation projector resources that are available to receive the subset image data and header data over the wireless transmission medium. A wireless image transmission session is established with the selected presentation projector resource during which the selected presentation projector is unavailable to other devices. The screen scraper sender logic compresses the delta image data and coordinates transmission of the subset of the digital image data and header data with a screen scraper receiver logic on the presentation projector resource so that data is sent only when ready to be received.

According to one aspect of the invention, the presentation projector resource is further equipped with a wireless to digital visual interface (DVI) graphics engine to decompress and render the transmitted subset of the digital image data for output to a DVI connector receptacle on the presentation projector resource in accordance with the Digital Display Working Group's DVI specification. The screen scraper receiver logic further applies the rendered image to the projected image in accordance with the associated header data so that the exact image that appears on the image generation device also appears on the projected display.

In accordance with other aspects of the present invention, apparatus are provided for carrying out the above and other methods.

BRIEF DESCRIPTION OF THE DRAWINGS

The present invention will be described by way of exemplary embodiments, but not limitations, illustrated in the accompanying drawings in which like references denote similar elements, and in which:

FIG. 9 illustrates a data layout of a header data in accordance with one embodiment;

FIG. 15 illustrates a general-purpose computer system upon which an embodiment of the wireless image transmission to a projector method and apparatus may be implemented.

WRITTEN DESCRIPTION

In the following description various aspects of the method and apparatus for wireless image transmission to a projector will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well-known features may be omitted or simplified in order not to obscure the present invention.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
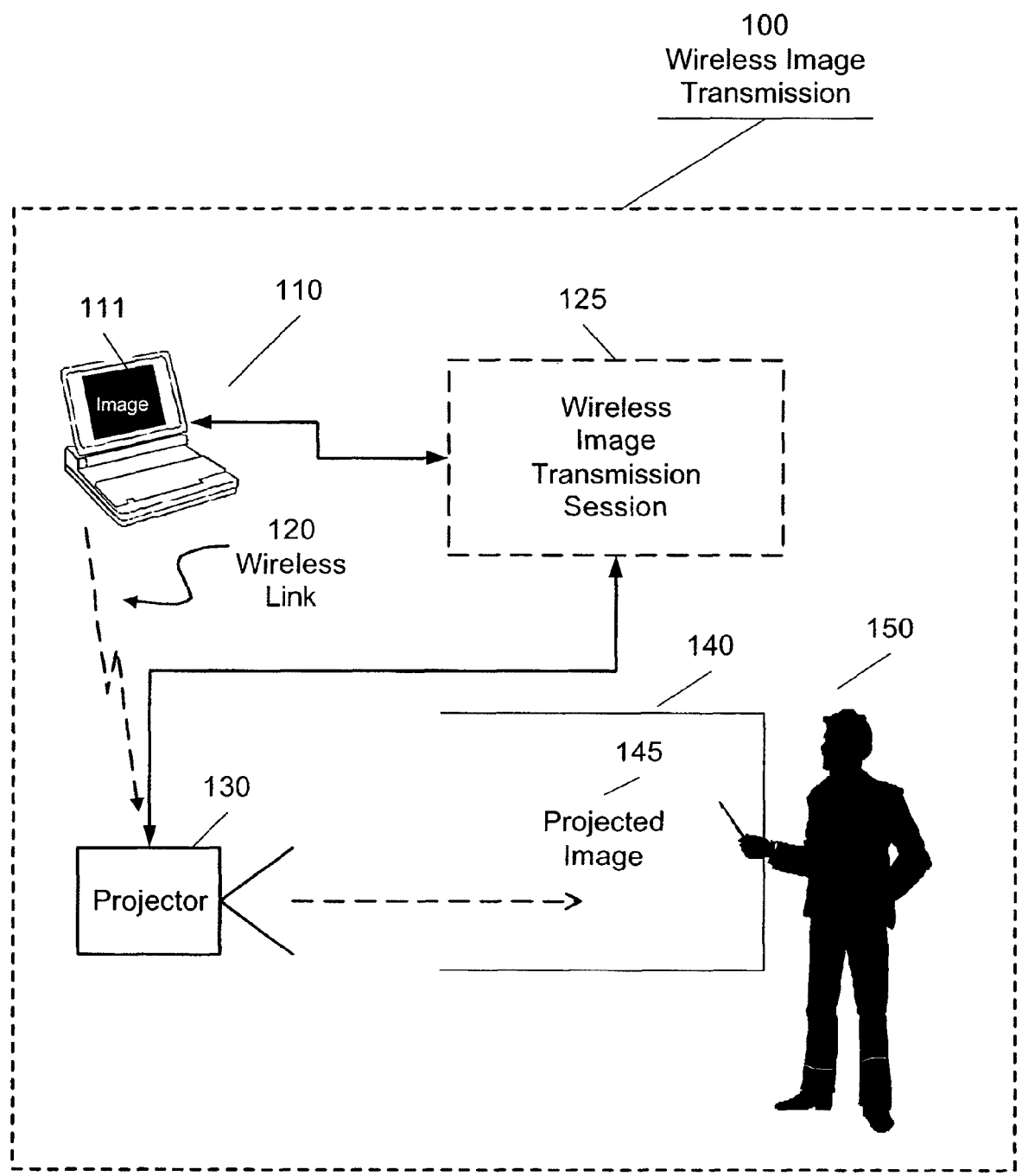
FIG. 1 illustrates an overview of the method and apparatus for wireless image transmission to a projector in accordance with one embodiment.

FIG. 1 illustrates an overview of the method and apparatus for wireless image transmission to a projector 100 in accordance with one embodiment. As illustrated, an image-generating device 110 such as a laptop computer generates a digital image on a display device 111 that is transmitted over a wireless link 120 to a remote presentation projector 130 for projection 145 to a presentation display surface 140 by a presenter 150 during a wireless image transmission session 125 established between the image-generating device 110 and the remote presentation projector 130.

In one embodiment, the image generation device 110 may be any desktop personal computer, laptop computer, personal digital assistant (PDA), or other type of computer appliance capable of running an operating system platform with a graphical user interface such as Microsoft's Windows 98, Windows 2000, and Windows CE platforms. The image generation device 110 generates a digital image for a display device 111 that may be an LCD screen as illustrated or any type of display monitor that is capable of displaying the image generated by the image generation device 110. In one embodiment the display device 111 may be eliminated, in which case the presenter 150 would rely solely on the projected image 145 for display of the digital image. The image-generation device 110 establishes a wireless image transmission session 125 with a remote presentation projector 130 that is accessible over the wireless link 120. During the wireless image transmission session 125, the image generation device 110 functions as a projector server host that serves the generated digital image data via the wireless link 120 to the presentation projector 130.

In one embodiment, the wireless link 120 may be any wireless transmission medium for a wireless network environment, including wireless networks designed in accordance with the IEEE 802.11 Wireless LAN Standard, or the Draft Specification of Bluetooth: A Global Specification for Wireless Connectivity, promulgated by the Bluetooth Special Interest Group.

In one embodiment, the remote presentation projector 130 is network-enabled and accessible over wireless link 120 and typically operates using a real-time operating system (RTOS) such as Wind River VX Works or Microsoft's Windows CE. The presentation projector 130 is further capable of receiving digital image data using the Digital Visual Interface version 1.0 (DVI), published by the Digital Display Working Group on Apr. 2, 1999. The presentation projector 130 may be a liquid crystal display (LCD), digital mirror device (DMD), liquid crystal on silicon (LCOS) projector or the like that include a light source and transmissive or reflective projection optics to form and project display images on a display surface 140 in both rear and front display applications. Examples of such presentation projectors are sold under the trademark LIGHTPORT by InFocus Corporation of Wilsonville, Oreg., the assignee of the present application.

Figure 2:
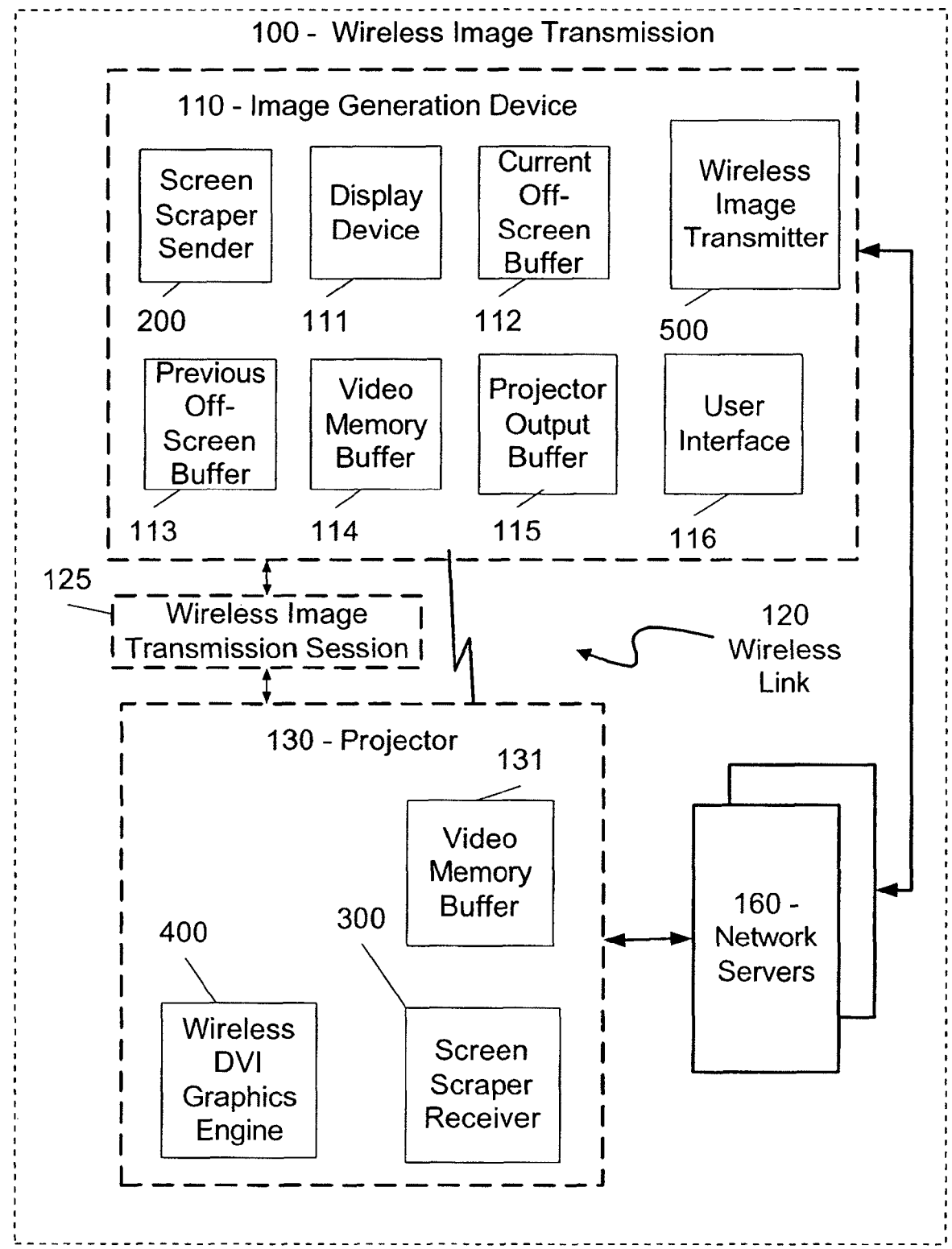
FIG. 2 illustrates a block diagram of selected components of the method and apparatus for wireless image transmission to a projector illustrated in FIG. 1, in accordance with one embodiment.

FIG. 2 illustrates a block diagram of selected components of the method and apparatus for wireless image transmission to a projector illustrated in FIG. 1, in accordance with one embodiment. The wireless image transmission 100 comprises the image-generating device 110 that is capable of running a wireless image transmitter logic 500 and a screen scraper sender logic 200. The wireless image transmitter logic 500 initiates and administers the wireless image transmission session 125 between the image generating device 110 and the presentation projector 130. The screen scraper sender logic 200 captures and generates a subset of the digital image data that was generated by the image generating device 110 for display to the display device 111, and prepares the subset of the digital image data for transmission over the wireless link 120 to a presentation projector 130.

In one embodiment, the presentation projector 130 is capable of running a screen scraper receiver logic 300 as well as a wireless DVI graphics engine 400, which together enable the presentation projector 130 to receive the subset of the digital image data from the screen scraper sender logic 200 of the image generating device 110 and to render a continuously updated image to the projector's video memory buffer 131 for display to the projector display 140 with a minimal delay, regardless of the wireless transmission medium of the wireless link 120.

The screen scraper sender logic 200, screen scraper receiver logic 300, wireless to DVI graphics engine 400, and wireless image transmitter logic 500, operate together with other selected components of the image generation device 110 and projector 130, including the display device 111, a current off-screen buffer 112, a previous off-screen buffer 113, a image generator device video memory buffer 114, a projector output buffer 115, a user interface 116, and a projector video memory buffer 131, the manner of which operation is described in further detail in FIGS. 3-13. In one embodiment the screen scraper sender logic 200, the wireless transmitter logic 500, or any of the other components of the image generation device 110 may reside externally to the image generation device 110 as, for example, in another network server computer 160 in communication with the image generation device 110, or other computer device, including a storage medium that is machine-accessible. Similarly, although illustrated as part of the presentation projector 130, in one embodiment the components of the screen scraper receiver logic 300 or the wireless to DVI graphics engine 400 may reside externally to the presentation projector 130. For example, portions or all of those components may be resident in a network server computer 160 functioning as a projector server computer in communication with the presentation projector 130.

Figure 3:
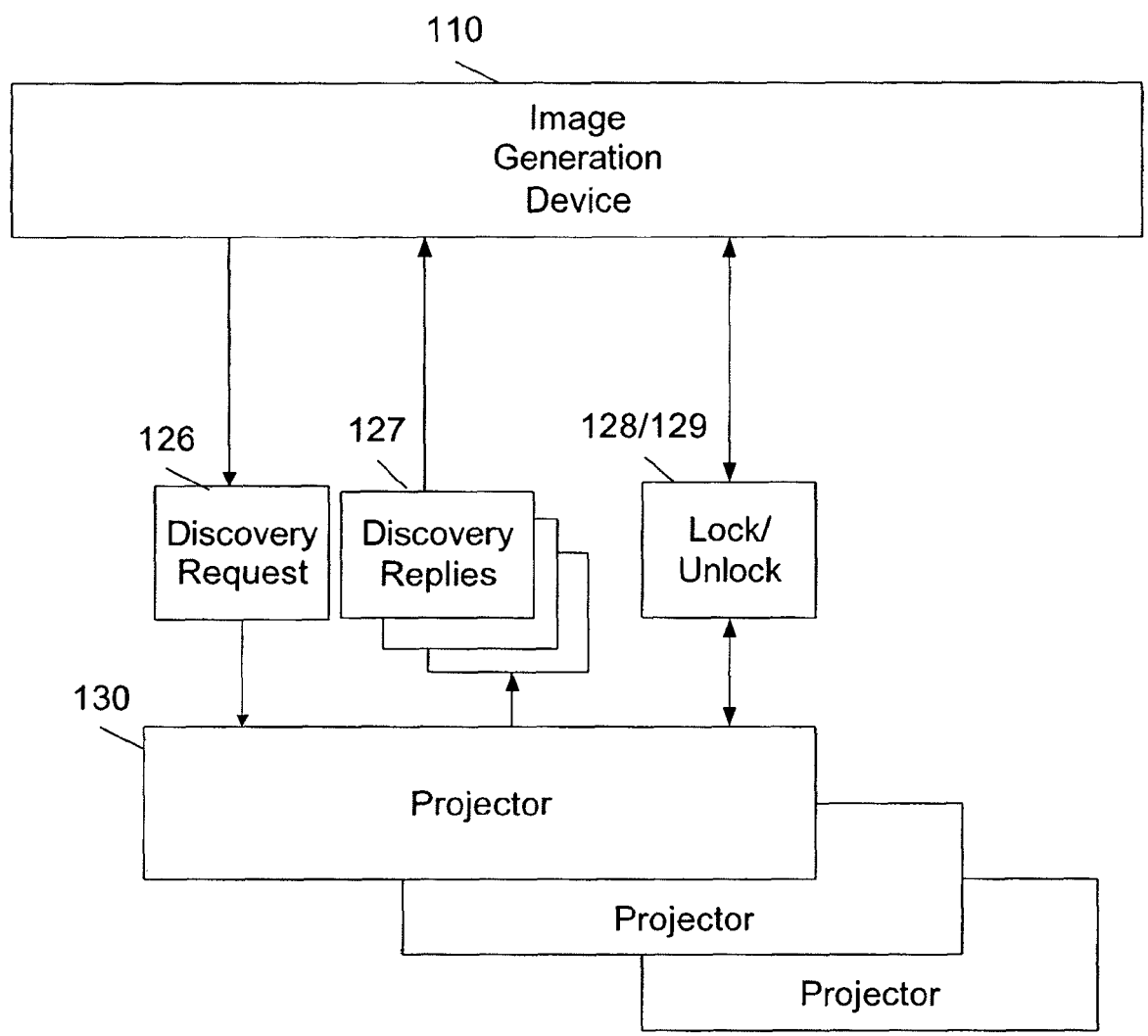
FIG. 3 illustrates a simplified block diagram overview of the initiation and administration of a wireless image transmission session illustrated in FIG. 1, in accordance with one embodiment.

FIG. 3 illustrates a simplified block diagram overview of the initiation and administration of the wireless image transmission session 125 by the wireless image transmitter logic 500 of image generation device 110. In response to a single user action via user interface 116 on the image generation device 110, the wireless image transmitter logic 500 sends a discovery request 126 to all projectors 130 accessible over wireless link 120. Those projectors that cans respond to the request do so by returning a projector discovery reply 127. Depending on certain characteristics of the discovery replies 127, the wireless image transmitter logic 500 automatically determines which projectors 130 are most suitable. The wireless image transmitter logic 500 selects one of the suitable projectors, either automatically or in response to a further user selection on user interface 116, and initiates the wireless image transmission session 125 by sending a lock command 128 to lock the selected projector 130 for exclusive use. Upon termination of the wireless image transmission session 125, the wireless image transmitter logic 500 sends an unlock command 129 to release the projector 130 so that it is available for use by others.

Figure 4:
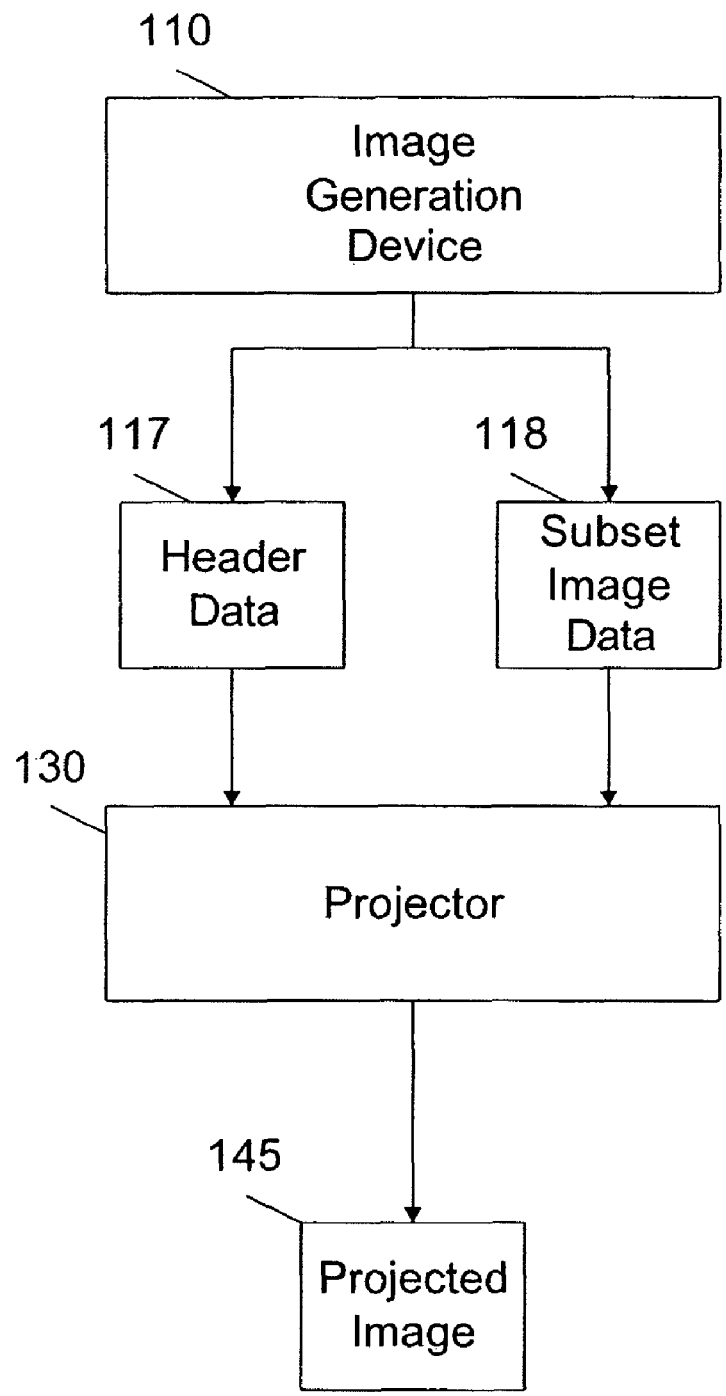
FIG. 4 illustrates a simplified block diagram overview of the transmission of data during the wireless image transmission session illustrated in FIG. 1, in accordance with one embodiment.

FIG. 4 illustrates a simplified block diagram overview of the transmission of data during the wireless image transmission session 125. The screen scraper sender logic 200 of the image generation device 110 generates a subset of the image generated for the display device 111 and transmits to the selected projector 130, not only the subset of the digital image data 118, but also an associated header data 117. The subset of the digital image data 118 may comprise a delta image data that represents those areas of the image generated by the image generation device 110 that have changed since the last transmission. Alternatively, the subset of the digital image data 118 may comprise an SVG formatted image data that represents certain graphics primitives of the image generated by the image generation device 110. The associated header data 117 identifies the type of digital image data being transmitted as well as certain characteristics of the digital image data, including the size, height, width, and position of the image, and whether and which type of compression was used.

It should be noted that in FIGS. 5-8, 10, 12-13, the particular methods of the invention are described in terms of computer software logic with reference to a series of flowcharts. The methods to be performed by a computer constitute computer programs made up of computer-executable instructions. Describing the methods by reference to a flowchart enables one skilled in the art to develop such programs including such instructions to carry out the methods on suitably configured computers (the processor of the computer executing the instructions from computer-readable media). The computer-executable instructions may be written in a computer programming language or may be embodied in firmware logic, or even application specific integrated circuits (ASICs). If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computer causes the processor of the computer to perform an action or a produce a result.

The invention may be described by reference to different high-level software logic modules such as computer program modules, and/or low-level hardware contexts. Those skilled in the art will realize that program module references can be interchanged with low-level hardware instructions. Program modules include procedures, functions, programs, components, data structures, and the like, that perform particular tasks or implement particular abstract data types. The modules may be incorporated into single and multi-processor computing systems, as well as hand-held devices and controllable consumer devices (e.g., Personal Digital Assistants (PDAs), cellular telephones, etc.). It is understood that modules may be implemented on a single computing device, or processed over a distributed network environment, where modules can be located in both local and remote memory storage devices.

Figure 5:
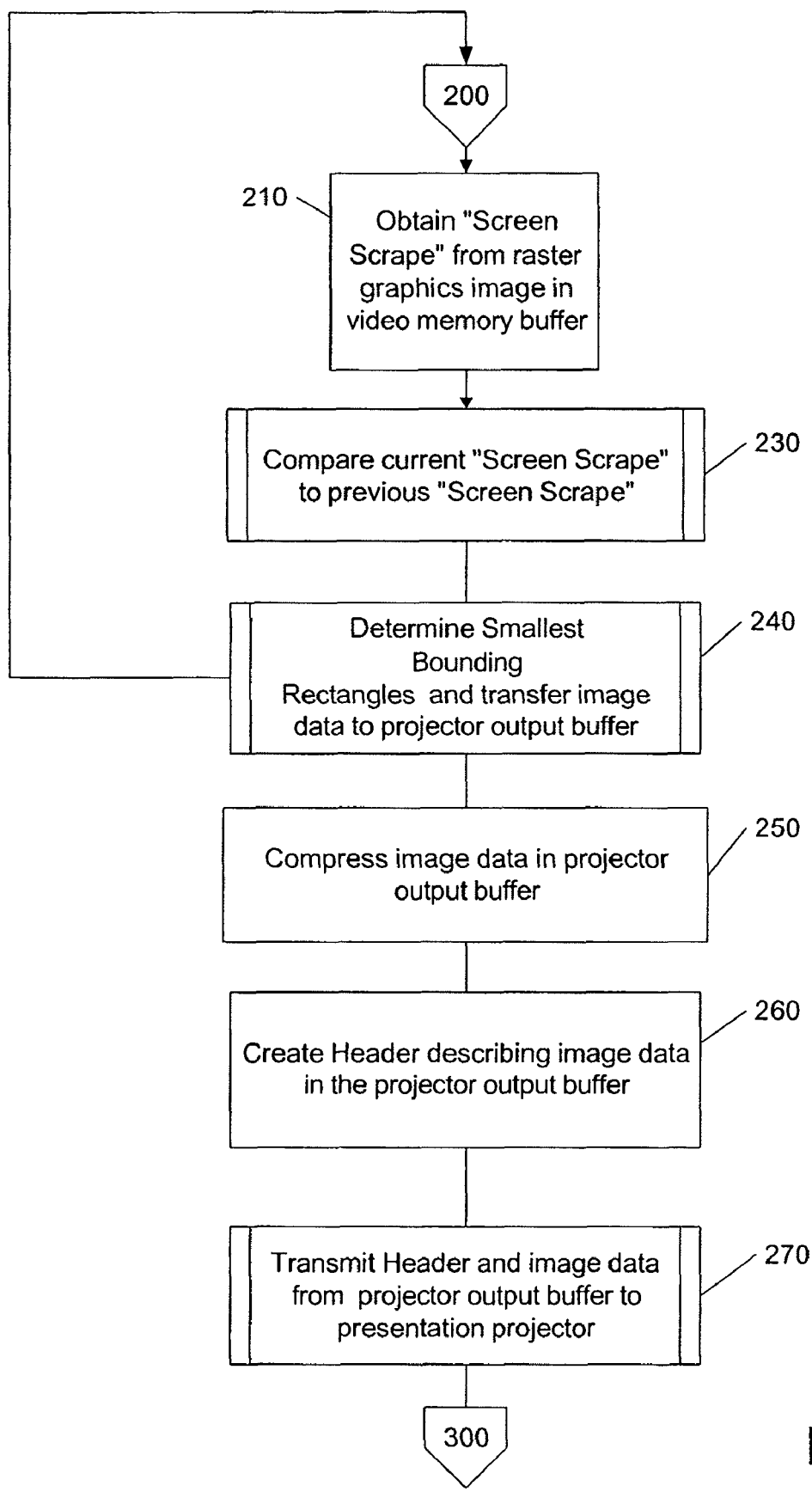
FIG. 5 illustrates a flow diagram of the operation of the method and apparatus for wireless image transmission to a projector screen scraper sender logic illustrated in FIG. 2 in accordance with one embodiment.

FIG. 5 illustrates in further detail selected functional components of the screen scraper sender logic 200 illustrated in FIG. 2 in accordance with one embodiment. At block 210 the screen scraper sender logic 200 obtains a copy of the raster graphics image from the video memory buffer 114 in the image generation device 110. The raster graphics image in the video memory buffer 114 is the binary data that represents the image on the image generation device's display device 111 (e.g. a computer monitor or a laptop LCD as illustrated in FIG. 1). The screen scraper sender logic 200 obtains the binary data by directly accessing the contents of the video memory buffer 114 using a display control interface such as, for example, the Microsoft Windows operating system's DirectDraw facility. The contents of the video memory buffer 114 are copied into the current off-screen buffer 112, and are referred to as a "screen scrape."

At block 230, the screen scrape sender logic compares the "screen scrape" in the current off-screen buffer 112 with the "screen scrape" that was previously saved in the previous off-screen buffer 113. If there are no changes, then the screen scraper sender logic 200 repeats the processes in blocks 210, 220, and 230 until a change in the digital image occurs. If there are changes, then the screen scraper sender logic continues at block 240 to determine the smallest bounding rectangle that encompasses the changes in the digital image. Depending on the changes, there may be several bounding rectangles that encompass the changes in the image.

Figure 6:
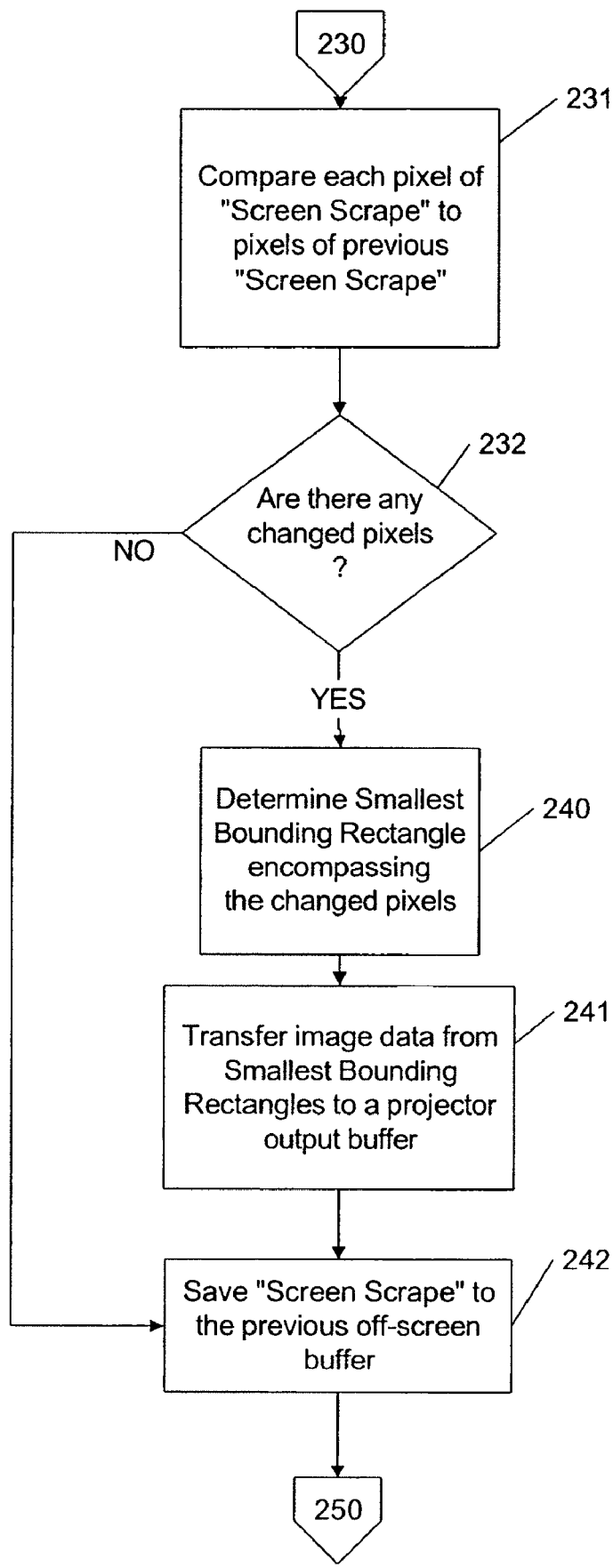
FIG. 6 illustrates in further detail selected aspects of the screen scraper sender logic illustrated in FIG. 2 in accordance with one embodiment.

FIG. 6 illustrates in further detail the screen scrape comparison at block 230 and the determination of the smallest bounding rectangle at block 240 of the screen scraper sender logic 200 illustrated in FIG. 3 in accordance with one embodiment. At block 231, the screen scraper sender logic compares each pixel of the screen scrape in the current off-screen buffer 112 to each corresponding pixel of the previous screen scrape in the previous off-screen buffer 113. At block 232, the screen scraper sender logic 200 determines whether there are any changed pixels. If there are changed pixels at block 232-YES branch, then processing continues at block 240 to determine the smallest bounding rectangle that encompasses those pixels of the screen scrape in the current off-screen buffer 112 that have changed since the previous screen scrape in the previous off-screen buffer 113 was obtained. It should be noted that, in one embodiment, each pixel may be comprised of digital image data for each of the color, shades of gray, and/or intensity components that represent the optical state of the pixel. In determining whether the pixel value has changed, any one or all of these color, grayscale, or intensity components may be compared.

At block 241, processing continues to transfer the pixels encompassed by the smallest bounding rectangle, i.e. the delta image data, to the projector output buffer 115 in preparation for transmission over the wireless link 120 to the presentation projector 130. The delta image data in the projector output buffer 115 is the subset image data 118 which is transmitted to the projector 130. When received by the screen scraper receiver logic 300, this delta image data will be used to update the projected image 145 using the wireless DVI graphics engine 400.

Returning now to FIG. 5, processing continues at block 250 where the screen scraper sender logic 200 compresses the subset image data 118 in the projector output buffer 115 in further preparation for transmission over the wireless link 120 to the presentation projector 130. In one embodiment, the compression is performed using a standard compression technique such as the LZO compression method of Franz Xavier Johannes Oberhumer. However, other compression techniques that provide lossless (or acceptably lossy) and efficient compression may be employed without departing from the principles of the present invention.

Figure 7:
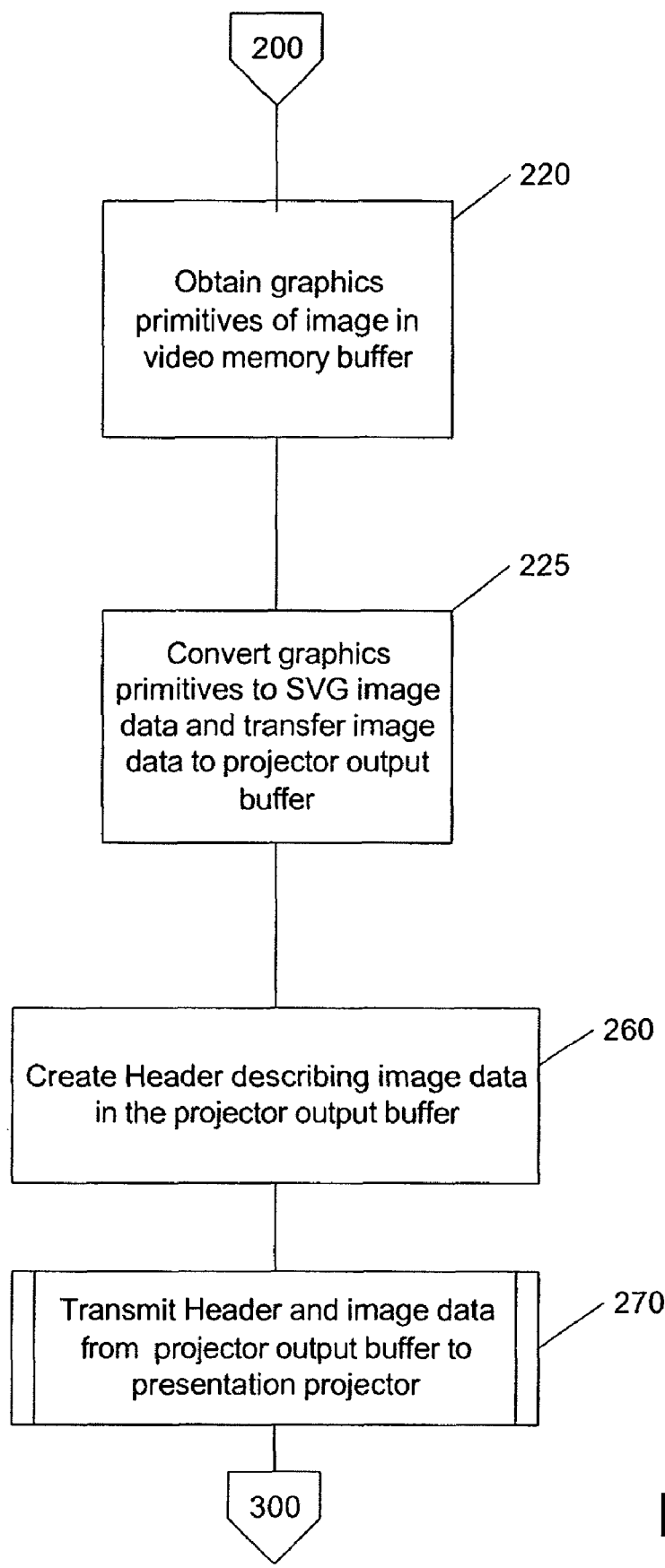
FIG. 7 illustrates in further detail selected aspects of the screen scraper sender logic illustrated in FIG. 2 in accordance with one embodiment.

FIG. 7 illustrates in further detail selected functional components of the screen scraper sender logic 200 illustrated in FIG. 2 in accordance with an alternate embodiment. Instead of using a raster graphics image as described in detail in FIGS. 5 and 6, FIG. 7 illustrates the use of scalable vector graphics (SVG) images. An SVG image is a description of a digital image using mathematical equations called vector graphics, instead of the bit-pattern description of the image itself as used in raster graphics images. One advantage to using vector graphics is that the image can easily be made scalable, whereas an image specified in raster graphics is a fixed-size bitmap. In one embodiment, at block 220, the "screen scrape" is rendered into the current off-screen buffer 112 by first obtaining the operating system dependent graphics primitives that comprise the image from the video memory buffer 114 instead of the raster graphics image. At block 225, the screen scraper sender 200 converts the graphics primitives to an SVG image data and transfers the SVG image data to the projector output buffer 115 in preparation for transmission over the wireless link 120 to the presentation projector 130. The SVG image data in the projector output buffer 115 is the subset image data 118 which is transmitted to the projector 130. When received by the screen scraper receiver logic 300, this SVG image data will be used to update the projected image 145 using the wireless DVI graphics engine 400.

The SVG description of the image may be implemented as an application of the Extensible Markup Language (XML), but other types of vector graphic descriptions may be employed without departing from the principles of the present invention. When SVG is used to describe the image, then the delta image data determination and special image compression described in FIGS. 5-6 would not be used. Rather, the SVG image data itself represents a highly compressed image representation. Thus determination of a delta image data and additional compression would not be needed.

Returning again to FIG. 5, at block 260, the screen scraper sender logic 200 creates a header data 117 that contains data describing the subset image data 118 in the projector output buffer 115. In one embodiment, the data fields that comprise the header data 117 are illustrated in FIG. 9. As shown, the header data 117 is comprised of numerous data fields that are described in further detail below in Table 1.

TABLE 1

| | |
|---|---|
| Identifier | A value that identifies which type of subset image data 118 is being transmitted |
| Size | A value that represents the size of the image represented by the subset image data 118 |
| Revision number | A number that indicates which revision of the image is being transmitted since the initiation of the wireless image transmission session 125. |
| Image height | The height of the image represented in the subset image data 118 |
| Image width | The width of the image represented in the subset image data 118 |
| Bits per pixel | The number of bits per pixel of the image represented in the subset image data 118 |
| Horizontal position (x-coordinate) | The horizontal position of the image represented in the subset image data 118 |
| Vertical position (y-coordinate) | The vertical position of the image represented in the subset image data 118 |
| Data Coding Algorithm | A value indicating which algorithm has been used to encode or compress the subset image data 118, e.g. in the case of SVG image data, the SVG encoding algorithm (XML, etc.), or in the case of delta image data, the compression encoding algorithm (GIF, JPEG, LZO, etc.). |
| Compressed Size | A value that represents the size of the subset image data 118 after compression or encoding. |

In one embodiment, the header data 117 and subset image data 118 may be sent as a single packet of data across the wireless link 120. Upon receiving the single packet of data, the projector 130 parses the packet into header data 117 and subset image data 118.

Figure 8:
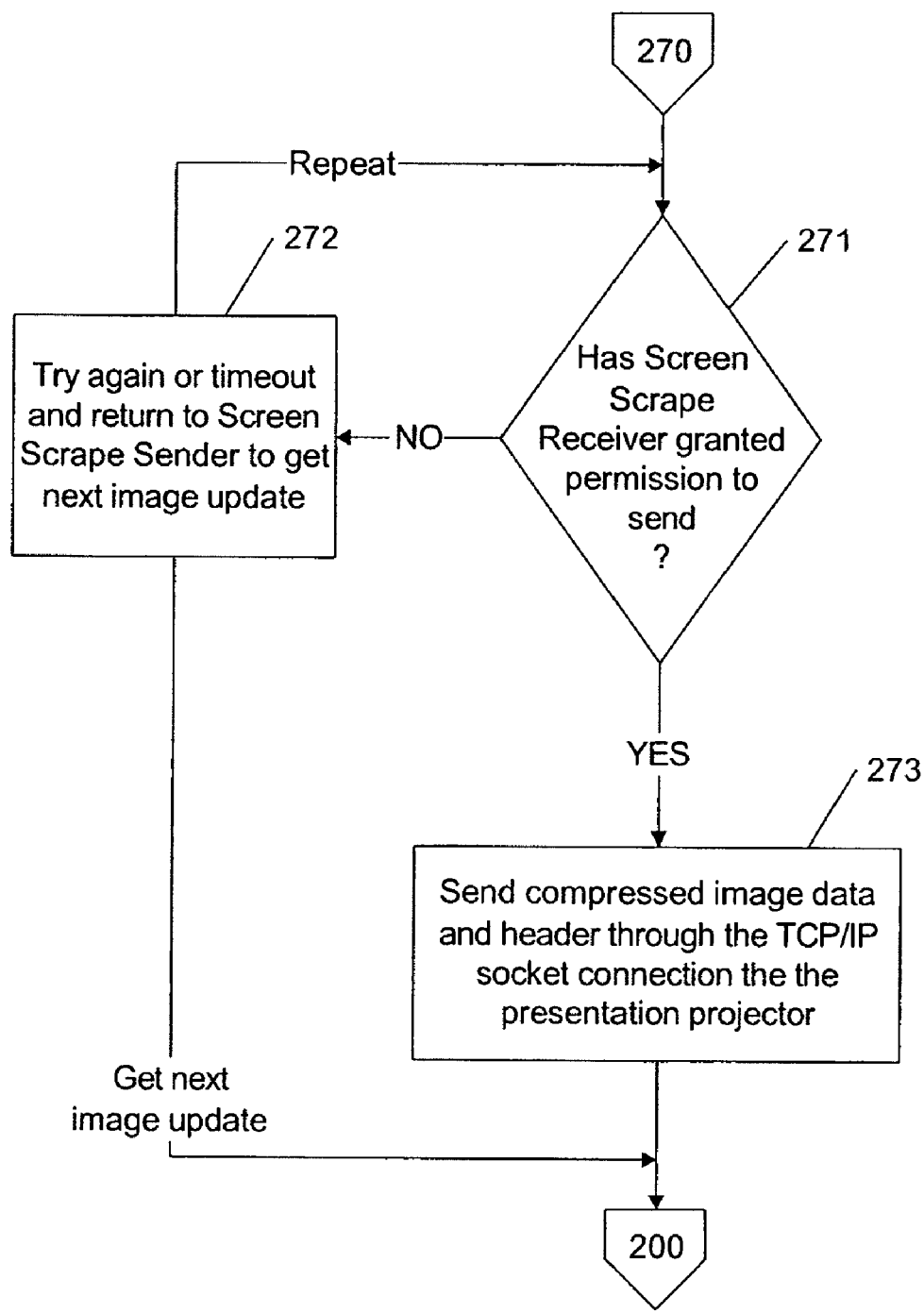
FIG. 8 illustrates in further detail selected aspects of the screen scraper sender logic illustrated in FIG. 2 in accordance with one embodiment.

Returning again to FIG. 5, the screen scrape sender logic 200 continues at block 270 by initiating the transmission of the header data 117 and the subset image data 118 from the output buffer 115 of the image generating device 110 to the input video memory buffer 131 of the presentation projector 130. FIG. 8 illustrates in further detail, at block 270, the screen scrape transmission portion of the screen scrape sender logic 200 illustrated in FIG. 3 in accordance with one embodiment. At block 271, the screen scrape sender logic 200 determines whether the screen scrape receiver 300 has granted permission to send the subset image data 118. The permission may be communicated using any proprietary or standardized mechanism that is capable of negotiating permission between the image generator device 110 and the projector 130. For example, a Universal Plug and Play method could be used to communication permission. If permission has not been granted, then at block 272, the screen scraper sender logic 200 returns to block 271 to try again until succeeding in either sending the subset image data 118 or timing out. If there is a time out, then the screen scraper sender logic 200 returns to the beginning at block 200 to start the screen scrape process over again.

In one embodiment, if the screen scrape receiver 300 grants permission to the screen scrape sender to send the subset image data 118, then the header data 117 and the subset image data 118 from the output buffer 115 of the image generation device 110 are sent over the wireless link 120 through a Transmission Control Protocol/Internet Protocol (TCP/IP) socket connection to the presentation projector 130. Other types of transport protocols other than TCP/IP that guarantee delivery so that no data is lost through the connection may also be used to transmit the header and delta subset image data without departing from the principles of the present invention.

The entire process embodied in the screen scraper sender logic 200 is repeated continually throughout the duration of the wireless image transmission 100, until the transmission is terminated by a user input by the presenter 150 through the user interface 116 of the image generation device 110 or by some other terminating event, such as a network or power failure. The end result is that the amount of image data transmitted over the wireless communication link 120 during the wireless image transmission session 125 is significantly reduced since the screen scraper sender logic 200 only sends the a subset image data 118 that represents either a delta image data or an SVG-encoded image data of the digital image data captured by the screen scraper sender logic 200.

Figure 10:
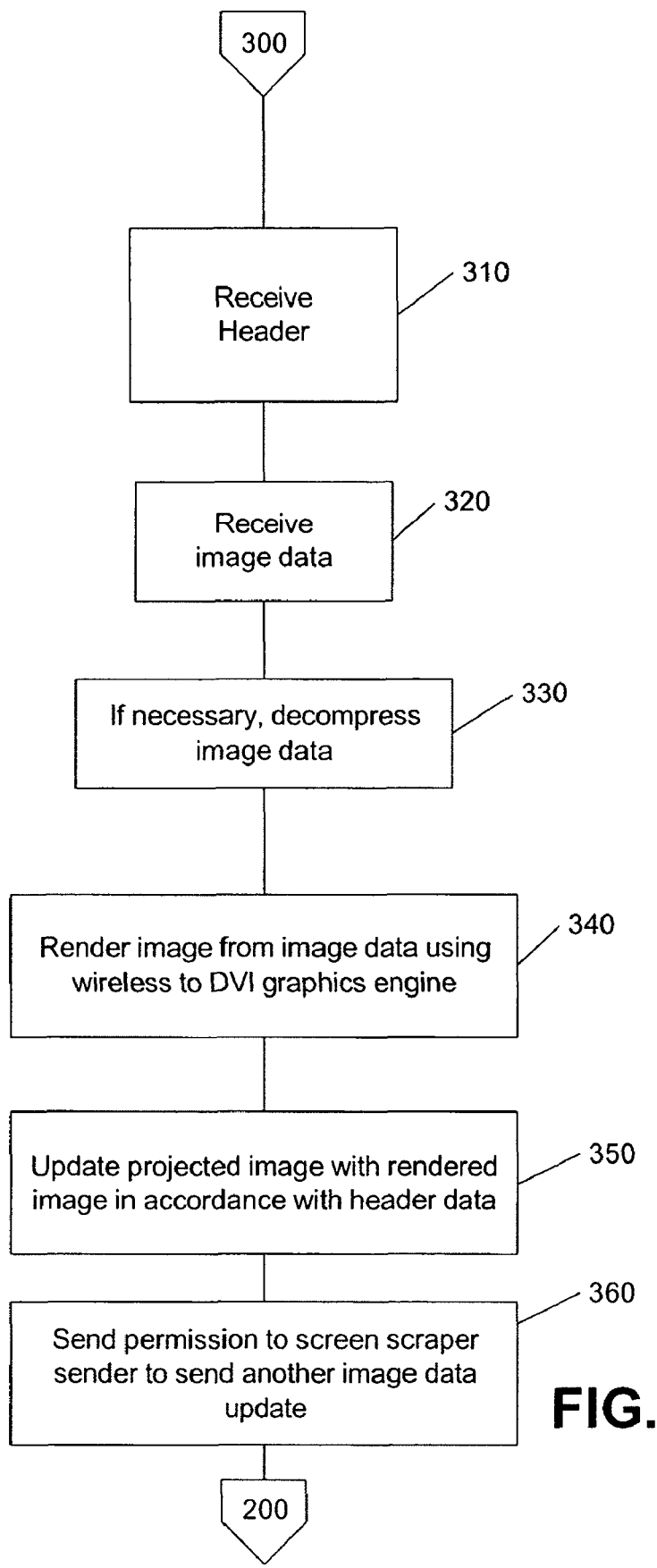
FIG. 10 illustrates a flow diagram of the operation of the method and apparatus for wireless image transmission to a projector screen scraper receiver logic illustrated in FIG. 2 in accordance with one embodiment.

FIG. 10 illustrates in further detail selected components of the screen scraper receive logic 300 illustrated in FIG. 2 in accordance with one embodiment. At blocks 310/320 the screen scraper receive logic 300 receives the header data 117 and subset image data 118. In the case where a delta image data has been transmitted, at block 330, the screen scraper receiver logic 300 decompresses the subset image data 118 in accordance with the header data 117 data fields that describe the subset image data 118, including the type of data coding algorithm used to compress the data. Using the wireless to DVI graphics engine 400, at block 340 the screen scraper receiver logic 300 initiates the rendering of the subset image data 118. The wireless to DVI graphics engine 400 is described in detail in FIG. 11 below. At block 350, the screen scraper receiver logic 300 updates the projected image 145 displayed by the projector 140 with the rendered subset image in accordance with the image description in the data fields of the header data 117. For example, by using the corresponding values in header data 117 data fields, image height, width, horizontal position and vertical position, the screen scraper receiver logic 300 can substitute, in the proper location, the pixels in the previous projected image with the pixels rendered from the subset image data 118. Other techniques for updating the projected image 145 with the rendered subset image data 118 may be employed without departing from the principles of the present invention. Finally, at block 360, the screen scraper receiver logic 300 grants permission to the screen scraper sender logic 200 to send another subset image data 118 of the next image captured by the screen scraper. Upon successful completion of each transmission, the screen scraper sender logic 200 returns to the beginning at block 210/220 to repeat the screen scrape sender and receiver processes 200/300 until the wireless image transmission to projector session 125 is terminated.

Figure 11:
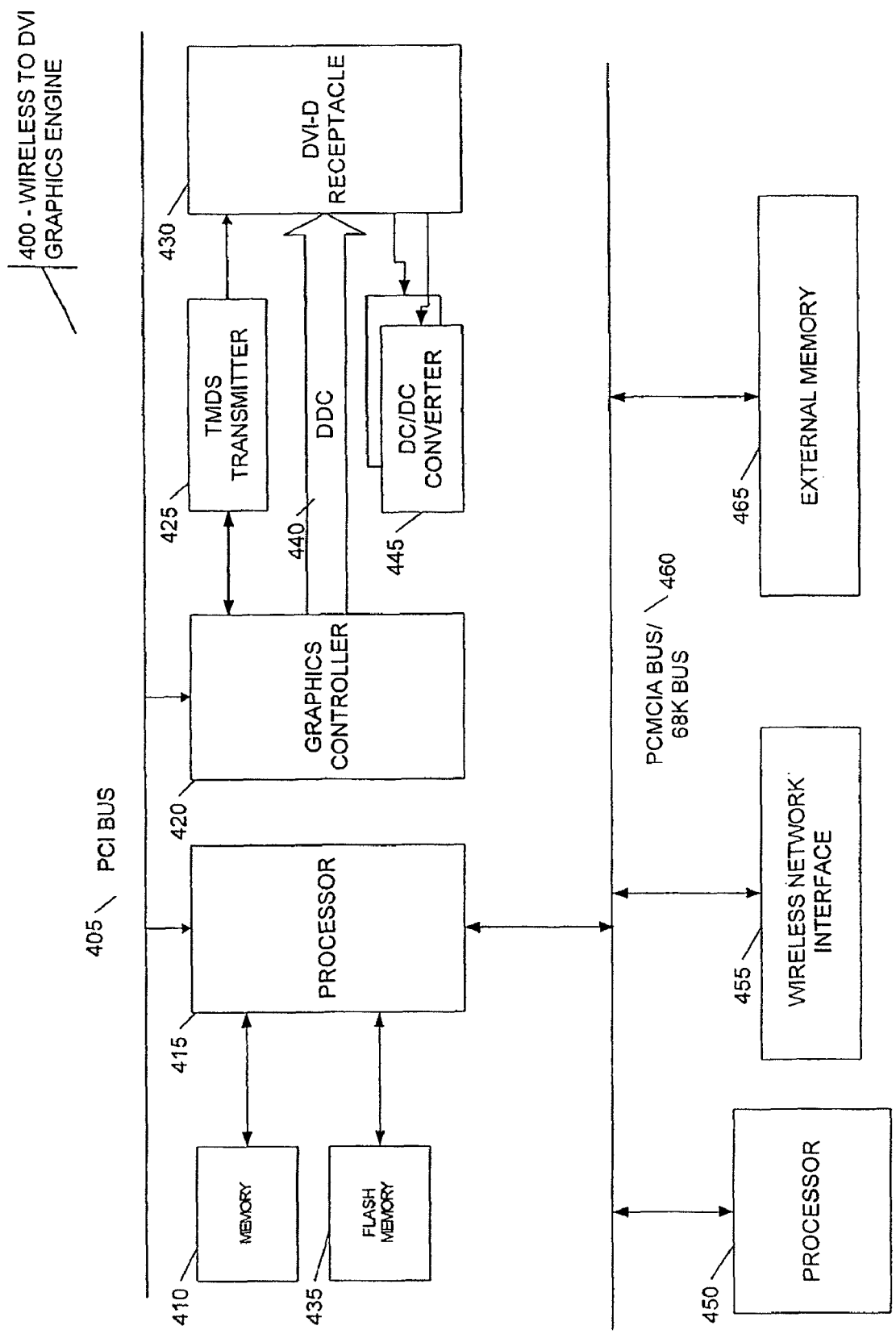
FIG. 11 illustrates in further detail selected aspects of the wireless to DVI graphics engine illustrated in FIG. 2 in accordance with one embodiment.

FIG. 11 illustrates in further detail selected components of the wireless to DVI graphics engine 400 illustrated in FIG. 2 in accordance with one embodiment. The wireless to DVI graphics engine 400 may be incorporated into the presentation projector 130 itself or in an external computing device, such as a network server 160 or other computing device, connected to the presentation projector 130. As shown, wireless to DVI graphics engine 400 comprises a PCI (peripheral component interconnect) bus 405, a PCMCIA (Personal Computer Memory Card International Association) bus or a 68K bus 460, or other communications hardware and software for communicating information, a processor 415 coupled with buses 405/460 for processing information, a graphics controller 420 coupled to the PCI bus 405. Wireless to DVI graphics engine 400 further comprises a main memory or other dynamic storage device 410 and a non-volatile flash memory 435 coupled to processor 415 for storing information and instructions to be executed by processor 415. Wireless to DVI graphics engine 400 may also comprise processor 450 and an external memory 465, coupled to bus 460, for storing and processing information and instructions. Graphics controller 420 is coupled to DVI-D receptacle 430 via a Display Data Channel (DDC) 440. The DVI-D receptacle 430 is equipped with a transmission minimized differential signaling (TMDS) link 425, which is used to transmit the graphics data to the projector display in accordance with the DVI standard. The DVI-D receptacle 430 is further connected to one or more Direct Current (DC) converters. A wireless network interface 455 is coupled to PCMCIA or 68K bus to receive the subset image data 118 and header data 117 from the image generation device 110.

In operation, the processor 415 decompresses the delta subset image data 118 that was received via wireless network interface 455, when necessary and in accordance with the header data 117 data field's, and sends the decompressed image data to the graphics controller 420. The graphics controller 420 receives the decompressed image data or the subset image data 118 directly and stores it in a frame buffer in memory 410. Subsequently, the graphics controller 420 retrieves the image data from the frame buffer in memory 410 and sends the image data to the TMDS transmitter 425 which, in turn, outputs DVI-formatted image data for input to the DVI-D receptacle 430 connected to the presentation projector display 130.

Figure 12:
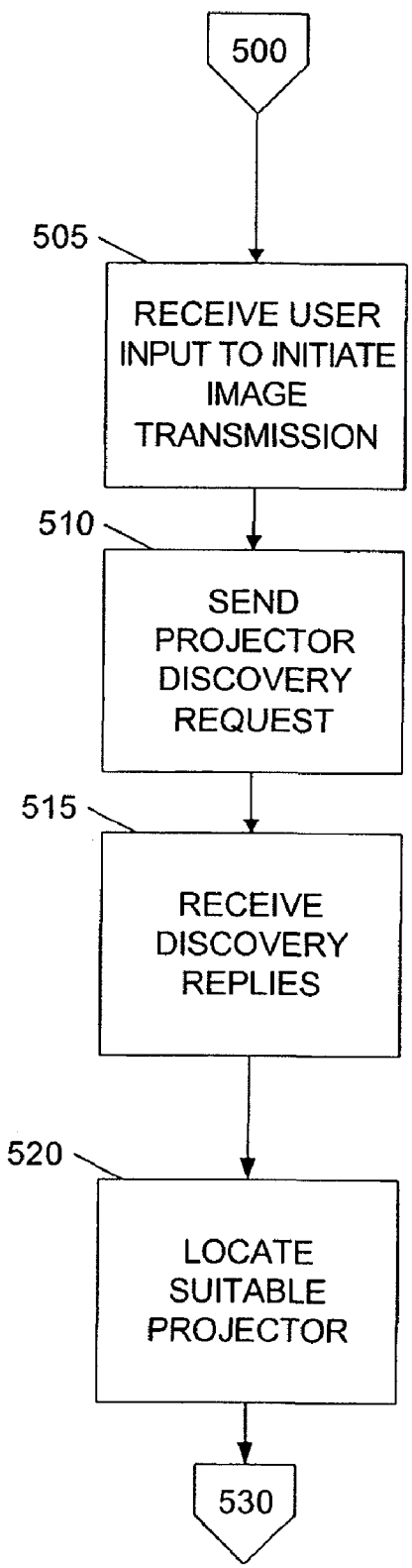
FIGS. 12-13 illustrate a flow diagram of the operation of the method and apparatus for wireless image transmission to a projector illustrated in FIGS. 1-4 in accordance with one embodiment.
Figure 13:
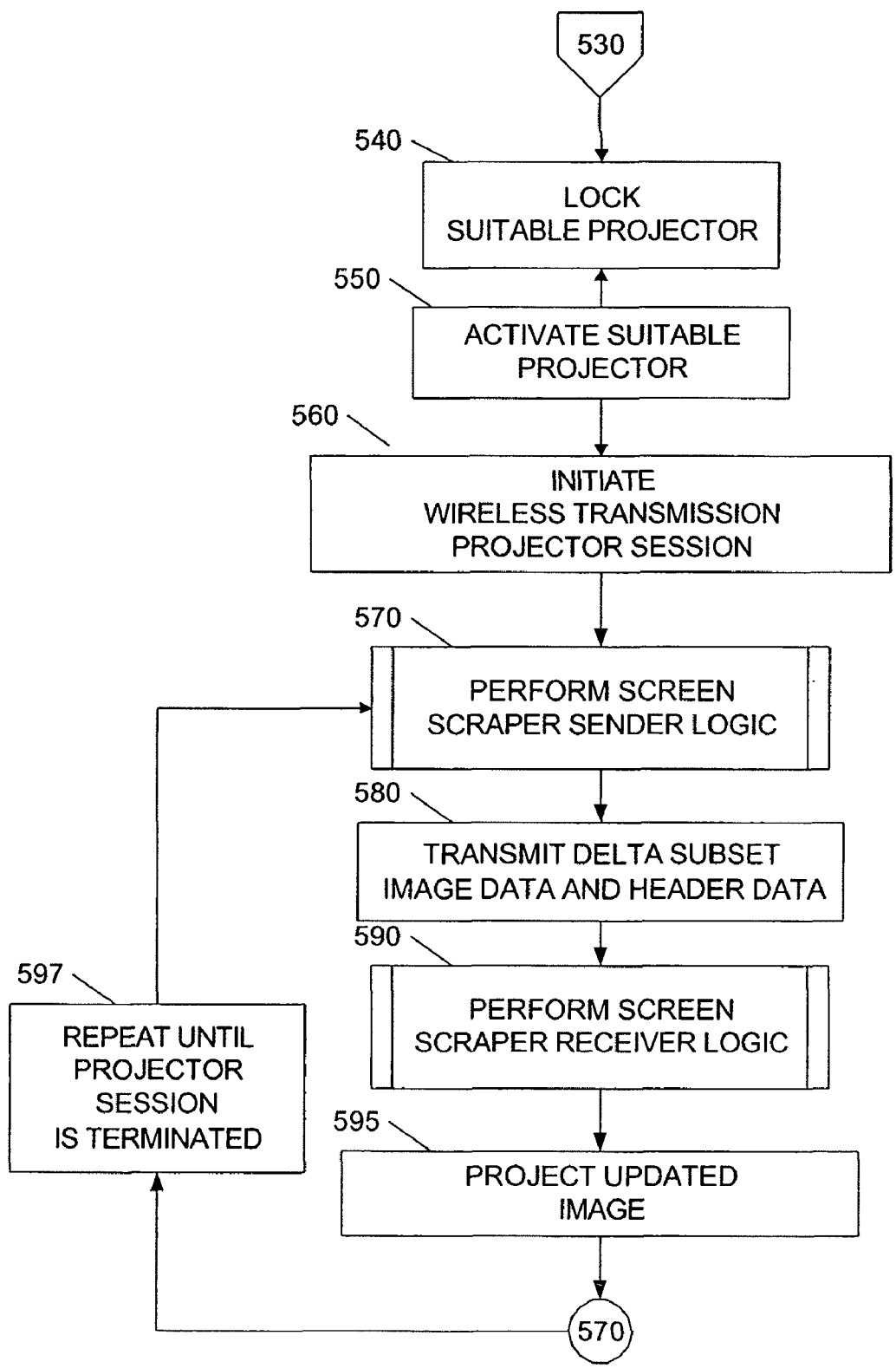

FIGS. 12-13 illustrate a flow diagram of the operation of the wireless image transmitter 500 illustrated in FIG. 1 in accordance with one embodiment. At block 505 the operation of the wireless image transmitter 500 begins with receiving a user input via user interface 116 of image generation device 110 to initiate an image transmission. The user input is typically entered on the image generation device 110 using an input device connected to the image generation device 110, either alone or in combination with a display graphical user interface 116 to indicate the user's desire to initiate the wireless image transmission session 125. However, it should be understood that other techniques for receiving the user input may be employed without departing from the principles of the present invention. In one embodiment, the user input comprises a single action taken by the user to initiate the wireless image transmission session 125.

At block 510, the wireless image transmitter 500 sends a projector discovery request 126 over the wireless link 120 in response to the user input entered at block 505. At block 515, the wireless image transmitter 500 receives projector discovery replies 127 from receivers (projectors) within radio frequency range of the image generation device 110. At block 520, the wireless image transmitter 500 automatically selects a suitable presentation projector 130 based on characteristics of the signal, such as the signal strength of the projector discovery replies or the signal's time displacement. In one embodiment, the identity of the projectors discovered would be displayed on the user interface 116 of the image generating device 110 and the presenter 150 would manually select the receiver projector 130 with which to initiate the wireless image transmission session 125. For example, the discovered projectors might be represented on the user interface 116 by various projector icons or other visual graphics symbols, and the user/presenter 150 would click on the desired projector icon to select the corresponding projector.

In one embodiment, the automatic selection of the projector may based on the characteristic of the elapsed time between sending of the discovery request 126 and the return of the discovery reply 127, provided that the signal processing time at the projector 130 does not introduce unwanted variability from projector to projector. Since the speed of light is 108 meters/second, there is an inherent (one-way) signal delay of 10 nanoseconds per meter of distance between image generation device 110 and the projector 130. The time it takes for the signal to go between the projector and image generation device need not be accurately measured, rather it is the order that the discovery replies 127 are received from the various projectors within discoverable range that is important. So projector-to-projector processing time variability should not exceed tens of nanoseconds for proper determination of the most suitable projector. In one embodiment, the automatic selection of the projector may be further based on the characteristic of the relative signal strength of the discovery replies 127, with the strongest signal indicating which of the responding projectors is most suitable. In one embodiment a combination of the order and signal strength of the discovery replies 127 are used to select the most suitable projector.

Turning now to FIG. 13, once a suitable presentation projector 130 is selected, at block 540 the wireless image transmitter 500 locks the suitable projector so that no other requester can use it using a projector lock-out process. In the projector lock-out process at block 540, the state of the projector 130 can be either "locked" or "unlocked". For example, the projector 130 is in a locked state if a wireless image transmission session 125 is already in progress or the projector is on and receiving images from one of its wired sources. When the wireless image transmitter 500 sends a query to the destination projector 130, a "locked" or "unlocked" state reply is returned. If the projector 130 is locked, a "projector is busy" message is displayed on the user interface 116 of the image generation device 110. If the projector is "unlocked," then, once the wireless image transmitter 500 starts the session 125, the projector's state changes to "locked." The state returns to "unlocked" when the session 125 concludes. In one embodiment, protocols such as Universal Plug and Play protocol are exploited to enable the projector states to be sent in response to queries. However, other proprietary methods could be employed without departing from the principles of the present invention.

At block 550, if necessary, a command to activate the locked projector 130, including turning on the projector light source, is issued by the wireless image transmitter 500. Once the presentation projector 130 is locked and activated, the wireless image transmitter 500 can initiate the wireless image transmission session 125 at block 560 using a peer-to-peer connectivity protocol such as Universal Plug and Play or a client-server data protocol such as the Microsoft Remote Desktop Protocol (RDP), the Citrix Independent Computing Architecture (ICA) protocol, or the International Telecommunications Union (ITU) Protocol T.120 protocol, and a transport protocol such as TCP/IP.

In one embodiment, once the projector wireless image transmission session 125 has been established, the wireless image transmitter 500 triggers the performance of the screen scraper sender logic 200 at block 570. At block 580, the wireless image transmitter 500 initiates the transmission to the presentation projector 130, using the above-described data and transport protocols, of the subset image data 118 and associated header data 117 as generated by the screen scraper sender logic 200.

Once the header data 117 and subset image data 118 arrives at the presentation projector 130, performance of the screen scraper receiver logic 300 is automatically triggered at block 590. The screen scraper receiver logic 300 uses a wireless to DVI graphics engine 400 to render the transmitted subset image data 118 to a bitmap and update the video memory buffer 131 resident in the presentation projector 130 in accordance with the associated header data 117. At block 595, the presentation projector 130 projects the updated image 145 to the projection display surface 140. At block 597, the wireless image transmitter 500 continues to operate in the above-described fashion by returning to block 570 and repeating the functions of blocks 570, 580, 590, and 595, until the wireless image projection session is terminated by the user/presenter 150 via the user interface 116 of the image generation device 110, or some other event that interrupts the session 125.

Using the above-described method for wireless image transmission to a projector, the entire image served by the image generation device 110 is effectively "compressed," because, after the initial transmission of the image, only a subset of the digital image data generated by the image generating device 110 is actually transmitted over the wireless link 120. Unlike prior art projector systems, where over 1 Gigabit/second data rate is required for transmission of a typical XGA image, even when that image is a still image, the wireless image transmission of the present invention requires only a fraction of that data rate. Even if every pixel in the XGA image suddenly changes, a worst case delay of only approximately 1.7 seconds is required to update the projected image 145 using the method and apparatus of the present invention. Since most presentations contain fairly static images, the typical delay time is significantly less so as to be imperceptible or nearly so to the user/viewer/presenter 150. The performance of the method and apparatus for wireless image transmission to a projector 100 is therefore superior to prior art projection systems and is particularly well suited to transmitting images wirelessly. It should be noted, however, that the method and apparatus may also be applied to a conventional wired image transmission without departing from the principles of the present invention.

Figure 14:
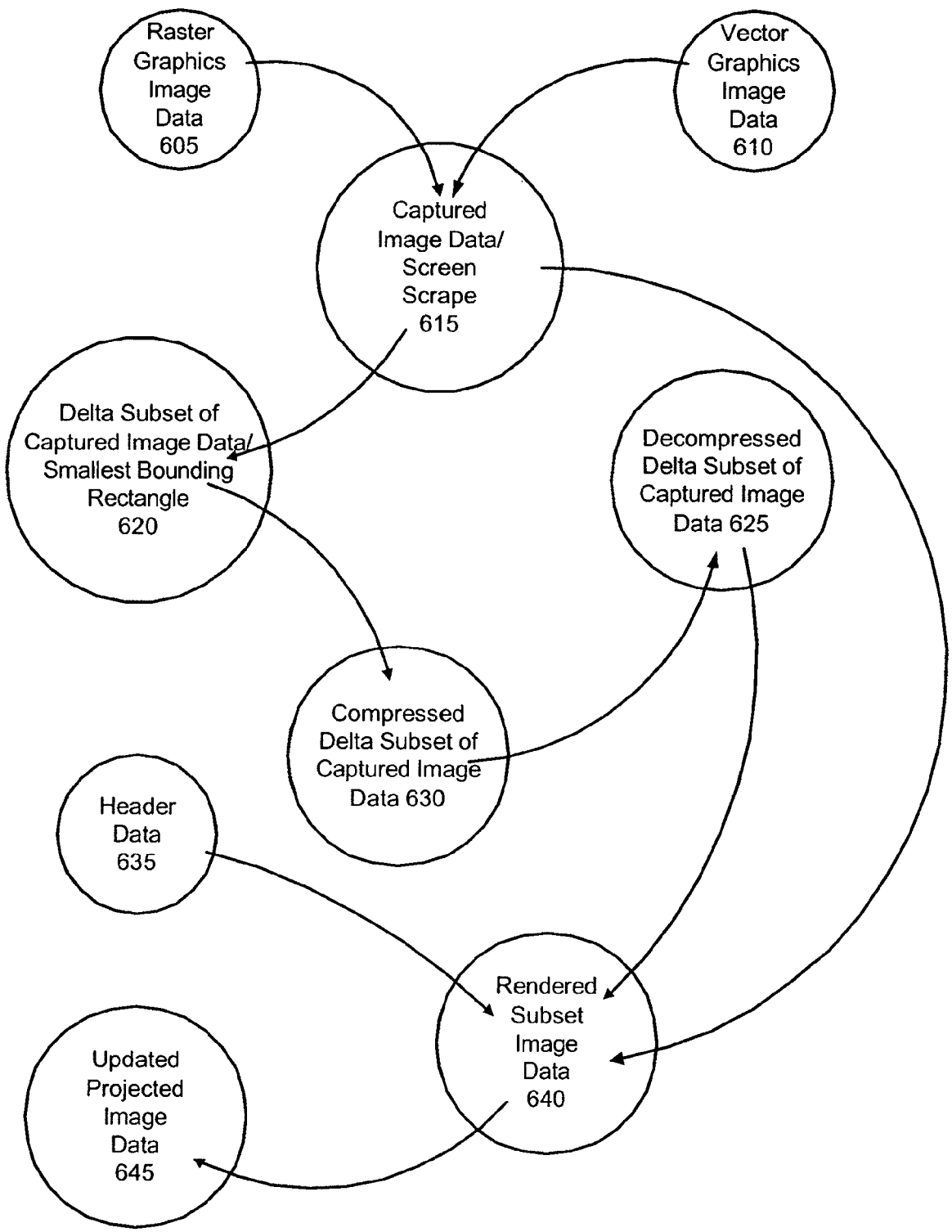
FIG. 14 illustrates a data flow diagram of the method and apparatus for wireless image transmission to a projector illustrated in FIGS. 1-4 in accordance with one embodiment.

FIG. 14 illustrates a data flow diagram of the method and apparatus for wireless image transmission to a projector illustrated in FIG. 1 in accordance with one embodiment. As shown, a raster graphics image data 605 or vector graphics image data 610 is captured from a video memory buffer into a screen scrape 615. In one embodiment, a delta subset of the captured image data from one screen scrape to the next, that can be encompassed by a smallest bounding rectangle 620 is saved in a projector output buffer. The delta subset of the captured image data is compressed 630 and sent over a wireless transmission link to a projector, where it is decompressed and rendered into a subset image data 640 in the projector's video memory buffer using the projector's graphics rendering engine. In one embodiment, an SVG format of the captured image data 610 is sent over a wireless transmission link to the projector, where it is rendered into the subset image data 640 in the projector's video memory buffer using the projector's graphics rendering engine. The rendered image is updated to the projected image data 645 in accordance with a descriptive header data 635 associated with the subset image data 640.

FIG. 15 illustrates a general-purpose computer system upon which an embodiment of the wireless image transmission to a projector method and apparatus may be implemented. As shown, general-purpose computer system 700 comprises a bus 701, or other communications hardware and software for communicating information, a processor 705 coupled with bus 701 for processing information, and a Universal Serial Bus (USB) host controller for controlling USB devices. Computer system 700 further comprises a random access memory (RAM) or other dynamic storage device 702 (referred to as main memory), coupled to bus 701 for storing information and instructions to be executed by processor 705. Computer system 700 also comprises a read only memory (ROM) 703, and/or other static storage device, coupled to bus 701 for storing static information and instructions for processor 702 (referred to as static memory). Mass storage device 704 is coupled to bus 701 for storing information and instructions. Furthermore, mass storage device 704, such as a magnetic disk or optical disk, and its corresponding disk drive, can be coupled to computer system 700. Computer system 700 can also be coupled via bus 701 to a display device 721 for displaying information to a computer user such as a network manager. Display device 721 is used to display windows containing a graphical user interface to the available electronic assets managed by the electronic asset lending library. Display device 721 can include a frame buffer, specialized graphics rendering devices, a cathode ray tube (CRT), and/or flat panel display. An input device 722, including alphanumeric and other keyed devices, or even a audio voice input device, is typically coupled to bus 701 for communicating information and command selections to processor 705. Another type of user input device, is cursor control device 723, such as a mouse, a trackball, a pen, a touch screen, or cursor direction keys for communicating direction information and command selections to processor 705, and for controlling cursor movement on display device 721. This input device typically has two degrees of freedom in two axes, a first axis (e.g., the x-axis) and a second axis (e.g., the y-axis), which allows the device to specify positions in a plane. However, this invention should not be limited to input devices with only two degrees of freedom.

Another device that may be coupled to bus 701 is a hard copy device 724 which may be used for printing instructions, data, or other information on a medium such as paper, film, or similar types of media. Additionally, computer system 700 can be coupled to a device for sound recording, and/or playback 725, such as an audio digitizer coupled to a microphone for recording information. Further, the device may include a speaker that is coupled to a digital to analog (D/A) converter for playing back the digitized sounds.

Network interface card 726 is coupled to bus 701. Network interface card 726 is further coupled to an external computer network such as a wireless local area network according to the IEEE 802.11, IEEE 802.11b, IrDA, and Bluetooth implementations. Network interface card 726 includes a wireless network interface card which, in conjunction with appropriate data communications protocols (e.g. Microsoft RDP, Citrix ICA, or the ITU T.120 protocols) and transport protocols (e.g. TCP/IP), provides the means by which the image generation device 110, wireless image transmitter 500, screen scrape sender 200, screen scrape receiver 300, presentation projector 130, and wireless to DVI graphics engine 400, exchange information with each other as well as other devices or application logic coupled to the same computer network. Modem 727 is coupled to bus 701, and provides an alternate means of exchanging information with other devices for which a modem connection to an external computer network or device (not shown) can be established.

Computer system 700 and the wireless image transmission application software logic or program modules, stored and executed therein as part of the method and apparatus for wireless image transmission to a projector, operate in conjunction with an operating system with graphics capability and a terminal server capability, such as the Microsoft Windows operating system with the graphics device interface—(GDI) and terminal services advanced client (TSAC). Commercially available computer systems implementing the features of general-purpose computer system 700 include a broad range of operating system-based computers, including server computers, desktop computers, workstations, personal digital assistants, devices, or computer appliances.

Referring now to FIGS. 1-15 together, it should be apparent that some or all of the above-described functions of the wireless image transmission method and apparatus 100 may be performed by one or more of the image generation device 110, the presentation projector 130, or by associated server computers in a variety of network configurations. In particular, some of the components of the image generation device 110 and presentation projector 130 may reside in part on network servers 160 that communicate with the image generation device 110 or with the presentation projector 130 over an intranet or Internet, or over a local area or wide area network or combination of networks, or any other network configuration capable of connecting them.

Accordingly, a novel method and apparatus is described for a wireless image transmission to a projector, so as to enable the remote control of and image transmission to presentation projector resources in a wireless network enterprise environment. From the foregoing description, those skilled in the art will recognize that many other variations of the present invention are possible. In particular, while the present invention has been described as being comprised of a screen scraper sender logic 200, screen scraper receiver logic 300, wireless to DVI graphics engine 400, and wireless transmitter logic 500 components, and being implemented on an image generation device 110 and a projector 130, some of the functions of these components may be distributed in other components of one or more general-purpose computer systems 700. Thus, the present invention is not limited by the details described. Instead, the present invention can be practiced with modifications and alterations within the spirit and scope of the appended claims.

The invention claimed is:

1. A method for transmission of an image comprising:
   generating a subset image data, wherein the subset image data is less than a frame of data;
   transmitting the subset image data to a projector to project an updated image using the subset image data;
   wherein generating the subset image data comprises determining a delta between a first image data and a second image data; and
   wherein the updated image comprises the projection of the first image data updated with the subset image data.

2. The method of claim 1, wherein the first and second image data comprise a raster graphics image.

3. The method of claim 1, wherein the delta between the first image data and the second image data is determined by a pixel-by-pixel comparison of pixels in the first image data with pixels in the second image data.

4. The method of claim 3, wherein the pixel-by-pixel comparison includes comparing a value of a pixel that represents an optical state of the pixel.

5. The method of claim 4, wherein the value is a color value.

6. The method of claim 4, wherein the value is a grayscale value.

7. The method of claim 4, wherein the value is an intensity value.

8. The method of claim 1, wherein the delta comprises a block of pixels in the second image data that include at least one pixel that is different from a corresponding pixel in the first image data.

9. The method claim 8, wherein the block of pixels is circumscribed by a smallest bounding rectangle that can encompass the at least one different pixel.

10. The method of claim 1, wherein generating a subset image data is performed by a personal computer.

11. The method of claim 1, wherein generating a subset image data comprises encoding a previously generated graphics primitive into a scalable vector graphics (SVG) format.

12. The method of claim 1, wherein transmitting the subset image data to the projector is over a wireless transmission medium.

13. The method of claim 1, wherein transmitting the subset image data to the projector comprises:
   discovering the projector via a wireless transmission medium;
   establishing a wireless transmission session with the projector; and
   obtaining permission from the projector to send the subset image data.

14. The method of claim 1, further comprising compressing the subset image data.

15. The method of claim 1, further comprising generating a first and second image data by capturing a screen scrape from a video memory buffer.

16. The method of claim 15, wherein the screen scrape is a raster graphics image.

17. The method of claim 1, wherein the subset image data is a scalable vector graphics encoding of a graphic primitive previously generated by an image generator.

18. The method of claim 1, further comprising:
   transmitting a header data that describes at least a size or position of the subset image data with the subset image data, and
   projecting the updated image in accordance with the header data.

19. The method of claim 1, further comprising transmitting the subset image data only after receiving a permission from the projector.

20. The method of claim 1, further comprising providing an image generator, wherein the image generator is a personal computer.

* * * * *